United States Patent
Scholz

(10) Patent No.: US 9,387,757 B2
(45) Date of Patent: Jul. 12, 2016

(54) HYBRID DRIVE CONFIGURATION FOR A MOTOR VEHICLE

(71) Applicant: VOLKSWAGEN AKTIENGESELLSCHAFT, Wolfsburg (DE)

(72) Inventor: Norbert Scholz, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/730,669

(22) Filed: Jun. 4, 2015

(65) Prior Publication Data

US 2015/0266369 A1   Sep. 24, 2015

Related U.S. Application Data

(63) Continuation of application No. PCT/EP2013/073247, filed on Nov. 7, 2013.

(30) Foreign Application Priority Data

Dec. 10, 2012 (DE) .......................... 10 2012 024 173

(51) Int. Cl.
*B60K 6/54* (2007.10)
*B60K 6/365* (2007.10)
(Continued)

(52) U.S. Cl.
CPC . *B60K 6/54* (2013.01); *B60K 6/365* (2013.01); *B60K 6/442* (2013.01); *B60K 6/445* (2013.01);
(Continued)

(58) Field of Classification Search
CPC ........ B60K 6/365; B60K 6/442; B60K 6/445; B60K 6/54; F16H 2037/107; F16H 2200/201; F16H 3/728
See application file for complete search history.

(56) References Cited

U.S. PATENT DOCUMENTS

| 2003/0078126 A1 | 4/2003 | Holmes et al. |
| 2006/0046886 A1 | 3/2006 | Holmes et al. |

(Continued)

FOREIGN PATENT DOCUMENTS

| DE | 10 2005 038 287 A1 | 5/2006 |
| DE | 10 2010 035 207 A1 | 3/2012 |

(Continued)

OTHER PUBLICATIONS

Search Report issued by the German Patent and Trademark Office for German Patent Application No. DE 10 2012 024 173.9, dated Aug. 22, 2013.

(Continued)

*Primary Examiner* — Derek D Knight
(74) *Attorney, Agent, or Firm* — Manfred Beck, P.A.

(57) ABSTRACT

A hybrid drive configuration for a motor vehicle includes a first, a second, and a third planetary gear set. The web of the third planetary gear set is connected to an input shaft, wherein either the sun gear or the internal gear of the third planetary gear set is connected to the rotor of a first electric machine and correspondingly either the internal gear or the sun gear of the third planetary gear set is coupled via a brake to the transmission housing, or the sun gear of the third planetary gear set is coupled via the brake to the transmission housing, wherein either the web or the internal gear of the third planetary gear set is connected to the input shaft and correspondingly either the internal gear or the web of the third planetary gear set is connected to the web of the second planetary gear set.

8 Claims, 8 Drawing Sheets

(51) Int. Cl.
  *B60K 6/442* (2007.10)
  *B60K 6/445* (2007.10)
  *F16H 3/72* (2006.01)
  *F16H 37/10* (2006.01)

(52) U.S. Cl.
  CPC .......... *F16H 3/728* (2013.01); *F16H 2037/104* (2013.01); *F16H 2037/107* (2013.01); *F16H 2200/201* (2013.01); *Y02T 10/6234* (2013.01); *Y02T 10/6239* (2013.01); *Y10S 903/911* (2013.01)

(56) References Cited

U.S. PATENT DOCUMENTS

| | | |
|---|---|---|
| 2009/0156351 A1 | 6/2009 | Brouwer et al. |
| 2009/0275437 A1 | 11/2009 | Kersting |
| 2011/0312462 A1 | 12/2011 | Park |
| 2012/0270691 A1 | 10/2012 | Tuckfield et al. |

FOREIGN PATENT DOCUMENTS

| | | |
|---|---|---|
| DE | 10 2010 035 209 A1 | 3/2012 |
| WO | 2009/077097 A1 | 6/2009 |

OTHER PUBLICATIONS

International Search Report for International Application No. PCT/EP2013/073247 and translation thereof, dated Feb. 4, 2014.

International Preliminary Report on Patentability for International Application No. PCT/EP2013/073247 including Written Opinion of the International Searching Authority and translation thereof, dated Jun. 16, 2015.

HYBRID DRIVE CONFIGURATION FOR A MOTOR VEHICLE

CROSS-REFERENCE TO RELATED APPLICATIONS

This application is a continuation, under 35 U.S.C. §120, of copending International Application No. PCT/EP2013/073247, filed Nov. 7, 2013, which designated the United States; this application also claims the priority, under 35 U.S.C. §119, of German Patent Application No. DE 10 2012 024 173.9, filed Dec. 10, 2012; the prior applications are herewith incorporated by reference in their entirety.

BACKGROUND OF THE INVENTION

Field of the Invention

The invention relates to a hybrid drive configuration for motor vehicles.

Hybrid drive configurations in the form of power-split transmissions are known to a person skilled in the art in a wide variety of configurations. German Patent Application DE 10 2005 038 287 A1 has disclosed a hybrid drive configuration having a first and a second electric machine which are configured with internal-rotor type of construction and which each have an internal rotor and an external stator fixed with respect to a housing and which can be operated both in motor mode and in generator mode. The two electric machines are connected to one another by way of power electronics. By way of the power electronics, the electric machines can furthermore be connected to an electrical energy store. An input shaft of the transmission is connectable to an internal combustion engine. An output shaft of the transmission is connectable to a drivetrain output section, which may in particular include a differential and the drive wheels. The known configuration furthermore includes two planetary gear sets. The first planetary gear set includes, as is conventional, a central sun gear, an outer internal gear, and a web on which there is rotatably arranged at least one set of planet gears which mesh at one side with the sun gear and at the other side with the internal gear. In the context of the present application, the expressions "sun gear" and "sun" and "planet gear" and "planet" are used synonymously, wherein what is meant in each case is the corresponding functional element with the gear itself, normally in the form of a spur gear, and the associated shaft. The second planetary gear set is of identical construction. In the case of the known configuration, the sun gear of the first planetary gear set is connected to the rotor of the second electric machine, the web of the first planetary gear set is connected to the output shaft, and the internal gear of the first planetary gear set is coupled by way of a first brake to the transmission housing. The sun gear of the second planetary gear set is connected to the rotor of the first electric machine, the web of the second planetary gear set is coupled both by way of a first clutch to the sun gear of the first planetary gear set and by way of a second brake to the transmission housing, and the internal gear of the second planetary gear set is connected to the input shaft.

Here, the expression "connected" is used in the sense of a fixed connection. By contrast, in the context of the present description, the expression "coupled" encompasses both fixed and also switchable or variable connections. If it is specifically the latter case that is meant, the corresponding switching element, in particular a brake or a clutch, will generally be explicitly referred to. By contrast, if it is specifically the former case that is meant, it is generally the case that the more specific expression "connected" will be used rather than using the expression "coupled". The use of the expression "coupled" without reference to a specific switching element thus indicates that it is specifically intended for both cases to be encompassed. This distinction is made purely for better comprehensibility, and in particular for clarifying where the provision of a switchable or variable connection instead of a fixed connection, which is generally easier to realize, is imperatively necessary. The above definition of the expression "connected" should therefore certainly not be interpreted so narrowly that clutches arbitrarily introduced for circumvention purposes would go beyond the meaning of the expression.

The known device offers seven operating modes, specifically three continuously variable, power-split drive ranges, two fixed gears (1× overdrive and 1× underdrive), a purely electric drive range, and a series drive range. It is not possible for all of the drive ranges to be made equally efficient. The transmission configuration is thus such that the predominantly used mode is made particularly efficient. However, with progressive advancement in the electrification of hybrid drives, the proportions in which the different modes are utilized is ever-changing.

SUMMARY OF THE INVENTION

It is accordingly an object of the invention to provide a hybrid drive configuration for a motor vehicle which overcomes disadvantages of the heretofore-known hybrid drive configurations of this general type. It is in particular an object of the invention to provide a new structure for a hybrid drive device with improved overall efficiency.

With the foregoing and other objects in view there is provided, in accordance with the invention, a hybrid drive configuration for a motor vehicle, including:

a transmission housing;

a first and a second electric machine each having a rotor and each having a stator fixedly connected to the transmission housing, the first and the second electric machine each being operable both in a motor mode and in a generator mode and, by way of power electronics, being connectable to one another and to an electrical energy store;

an input shaft, which is connectable to an internal combustion engine, and an output shaft, which is connectable to a drivetrain output section;

a first brake and a second brake;

a first clutch and a second clutch;

a first planetary gear set having a sun gear, a web, and an internal gear, the sun gear of the first planetary gear set being connected to the rotor of the second electric machine, the web of the first planetary gear set being connected to the output shaft, and the internal gear of the first planetary gear set being coupled by way of the first brake to the transmission housing;

a second planetary gear set having a sun gear, a web, and an internal gear, the sun gear of the second planetary gear set being both coupled by way of the first clutch to the internal gear of the first planetary gear set and connected to the rotor of the first electric machine, the web of the second planetary gear set being coupled by way of the second clutch to the web of the first planetary gear set, and the internal gear of the second planetary gear set being connected to the input shaft; and a third planetary gear set having a sun gear, a web, and an internal gear, the web of the third planetary gear set being connected to the input shaft, wherein either the sun gear of the third planetary gear set or the internal gear of the third planetary gear set is connected to the rotor of the first electric machine, and correspondingly either the internal gear of the third planetary gear or the sun gear of the third planetary gear set is coupled by way of the second brake to the transmission housing, or the sun gear of the third planetary gear set is coupled by way of the second brake to the transmission housing, wherein either the web of the third planetary gear set or the internal gear of the third planetary gear set is connected to the input shaft, and correspondingly either the internal gear of the third planetary gear set or the web of the third planetary gear set is connected to the web of the second planetary gear set.

According to another feature of the invention, a third clutch is provided, wherein the web of the first planetary gear set is coupled by way of the third clutch to the internal gear of the first planetary gear set.

According to yet another feature of the invention, a third brake is provided, wherein the rotor of the second electric machine is coupled by way of the third brake to the transmission housing.

According to another feature of the invention, a further clutch, which is designated as a fourth clutch in the specification below, is provided, wherein the input shaft is coupled by way of the further clutch to the rotor of the second electric machine.

According to a further feature of the invention, the input shaft and the output shaft are disposed axially adjacent one another, and respective attachment points of the input shaft and of the output shaft are situated at edges on opposite axial sides of the hybrid drive configuration.

According to another feature of the invention, the output shaft is embodied as a hollow shaft extending coaxially around the input shaft.

According to another feature of the invention, respective attachment points of the input shaft and of the output shaft are situated at an edge on a common axial side of the hybrid drive configuration.

In other words, the object of the invention is achieved by a hybrid drive configuration for a motor vehicle, including:

a first and a second electric machine which each have a rotor and a stator fixedly connected to a transmission housing and which can be operated both in motor mode and in generator mode and which can be connected to one another and to an electrical energy store by way of power electronics, an input shaft, which is connectable to an internal combustion engine, and an output shaft, which is connectable to a drivetrain output section, a first planetary gear set, the sun gear of which first planetary gear set is connected to the rotor of the second electric machine, the web of which first planetary gear set is connected to the output shaft, and the internal gear of which first planetary gear set is coupled by way of a first brake to the transmission housing, a second planetary gear set, the sun gear of which second planetary gear set is both coupled by way of a first clutch to the internal gear of the first planetary gear set and connected to the rotor of the first electric machine, the web of which second planetary gear set is coupled by way of a second clutch to the web of the first planetary gear set, and the internal gear of which second planetary gear set is connected to the input shaft, and a third planetary gear set, the web of which third planetary gear set is connected to the input shaft, wherein either the sun gear or the internal gear of the third planetary gear set is connected to the rotor of the first electric machine, and correspondingly either the internal gear or the sun gear of the third planetary gear set is coupled by way of a second brake to the transmission housing, or the sun gear of which third planetary gear set is coupled by way of the second brake to the transmission housing, wherein either the web or the internal gear of the third planetary gear set is connected to the input shaft, and correspondingly either the internal gear or the web of the third planetary gear set is connected to the web of the second planetary gear set.

With the drive configuration according to the invention, it is possible to realize a total of eight operating modes, specifically three continuously variable, power-split drive ranges, a series mode, two fixed gears and two purely electric drive ranges.

The first mode is a continuously variable drive range with power-split operation. For this purpose, the first brake and the second clutch are dosed, and the second brake and the first clutch are opened. Owing to the fixing of its internal gear by way of the first brake, the first planetary gear set acts purely as a transmission ratio stage for the torque transmitted from the second electric machine to the output shaft. Owing to the first clutch being open, the first planetary gear set is decoupled from the first electric machine and the two other planetary gear sets. Owing to its freewheeling internal gear, the third planetary gear set is switched into a substantially ineffective state. By contrast, the second planetary gear set acts as a branching point for branching the torque of the internal combustion engine both via the second clutch to the drive output shaft and via the sun gear of the second planetary gear set to the first electric machine.

A second operating mode is a fixed gear with parallel hybrid operation, which would correspond to a third gear in the case of conventional transmission ratios. This mode is realized with the first brake closed, the first and second clutch closed, and the second brake open. Owing to the first clutch being closed and the first brake being closed, the rotor of the first electric machine, the sun gears of the second and third planetary gear sets and the internal gear of the first planetary gear set are immobilized. Owing to its internal gear being released, the third planetary gear set is in this case switched into a substantially ineffective state. By contrast, the second planetary gear set acts purely as a transmission ratio stage for the torque transmitted from the internal combustion engine to the output shaft. The first planetary gear set acts purely as a transmission ratio stage for the torque of the second electric machine, which acts in parallel on the output shaft A third operating mode is a second continuously variable drive range with power-split operation. This mode is realized with the first and second clutch closed and the first and second brakes open. In this case, the second planetary gear set acts as a branching point for branching the torque of the input shaft both via the closed second clutch to the output shaft and via the sun gear of the second planetary gear set to the first electric machine. Owing to its internal gear being released, the third planetary gear set is substantially ineffective. The first planetary gear set acts as an introduction point for the torque of the second electric machine. By contrast to the solution known from the prior art, the power of the internal combustion engine is introduced not by way of a second planetary gear set which is in the form of a double planetary gear set and which has a relatively large number of tooth meshing points, but by way of a second planetary gear set which is in the form of a single planetary gear set and which has a relatively small number of tooth meshing points, which yields an advantage in terms of efficiency in the second power-split drive range.

A fourth operating mode is a further fixed gear with parallel hybrid operation, which would correspond to a sixth gear in the case of a conventional transmission ratio. This mode is realized with the second brake dosed, the first and second clutches dosed and the first brake open. Owing to the internal gear of the third planetary gear set being immobilized through the use of the second brake, the third planetary gear set acts together with the second planetary gear set as a fixed transmission ratio stage for the transmission of the torque from the input shaft to the output shaft. In parallel with this, the torque of the second electric machine acts on the output shaft via the first planetary gear set.

A fifth operating mode is a further continuously variable drive range with power-split operation. It is realized with the second brake and first clutch closed and the first brake and second clutch open. Owing to the second clutch being open, the direct connection between the second planetary gear set and the output shaft is eliminated. Instead, the rotor of the first electric machine is driven with the transmission ratio of the third planetary gear set, the internal gear of which is immobilized through the use of the second brake. In the first planetary gear set, the torque of the input shaft via the closed first clutch and the torque of the second electric machine are merged and conducted to the output shaft.

A sixth operating mode is a further continuously variable drive range, but with series hybrid operation. It is realized with the first and second brake closed and the first and second clutch open. In this layout, the second planetary gear set is switched into a substantially ineffective state. The rotor of the first electric machine is driven by the input shaft by way of the third planetary gear set, which acts purely as a transmission ratio stage owing to its internal gear being immobilized through the use of the second brake. The electrical energy produced generatively by way of the first electric machine is transmitted via the power electronics to the second electric machine, which electrically drives the output shaft via the first planetary gear set.

A seventh operating mode is a purely electric drive range. It is realized with the first and second brake dosed, the first clutch dosed and the second clutch open. In this case, in the third planetary gear set, two shafts are blocked; specifically, the internal gear is blocked by way of the dosed second brake, and the sun gear is blocked by way of the dosed first clutch and the dosed first brake. The third and second planetary gear sets and the input shaft are thus stationary. Drive is imparted purely electrically by the second electric machine via the first planetary gear set, which acts purely as a transmission ratio stage owing to its internal gear being immobilized through the use of the first brake.

An eighth mode is a further purely electric driving mode with rotational speed addition. It is realized with the first clutch closed, the first and second brakes open and the second clutch open. In this operating mode, both the first and the second electric machine operate as motors, wherein their rotational speeds are added in the first planetary gear set.

In an advantageous refinement of the invention, it is provided that the web of the first planetary gear set is coupled by way of a third clutch to the internal gear of the first planetary gear set. In this way, it is possible to realize two additional fixed gears in internal combustion engine-powered operation, a second continuously variable drive range in series hybrid operation with a reduced rotational speed of the second electric machine, and a further purely electric drive range with the second electric machine connected directly to the output shaft. A first additional fixed gear in parallel hybrid operation, which would correspond to a fourth gear in the case of conventional transmission ratios, is realized with the first, second and third clutches closed and the first and second brakes open. A further additional fixed gear with parallel hybrid operation, which would correspond to an eighth gear in the case of conventional transmission ratios, is realized with the second brake closed, the first and third clutches dosed and the first brake and second clutch open. A further continuously variable drive range with series hybrid operation is realized with the first and second brakes closed and the third clutch closed and with the first and second clutches open. Finally, the additional electric drive range is realized with the first and third clutches closed and with the first and second brakes open and the second clutch open. All other operating modes can each be realized in the above-described manner with the third clutch open.

In another refinement of the invention, which may be used alternatively or in addition, it is provided that the rotor of the second electric machine is coupled by way of a third brake to the transmission housing. It is achieved in this way that the second electric machine can be immobilized through the use of the additional third brake in the overdrive range. In this way, it is possible to realize two further fixed gears in internal combustion engine-power operation, and an additional purely electric drive range. A first additional fixed gear with parallel hybrid operation, which would correspond to a fifth gear in the case of conventional transmission ratios, is realized with the third brake closed, the first and second clutches closed and the first and second brakes open. A further fixed gear with parallel hybrid operation, which would correspond to a seventh gear in the case of a conventional transmission ratio, is realized with the second and third brakes closed, the first clutch closed, the first brake open, and the second clutch open. The additional, purely electric drive range is realized with the third brake closed, the first clutch closed, the first and second brakes open, and the second clutch open. All other operating modes can each be realized in the above-described manner with the third brake open.

In another refinement of the invention that can be used alternatively or in addition, it is provided that the input shaft is coupled by way of a fourth clutch to the rotor of the second electric machine. This gives rise to two further internal combustion engine-powered fixed gears with parallel hybrid operation. A first additional fixed gear with parallel hybrid operation, which would correspond to a second gear in the case of a conventional transmission ratio, that is to say a hill-climbing gear in internal combustion engine-powered underdrive operation, is realized with the first brake dosed, the second and fourth clutches dosed and the second brake open and the first clutch open. A further fixed gear with parallel hybrid operation, which corresponds to a fourth gear in the case of a conventional transmission ratio, is realized with the first, second and fourth clutches dosed and the first and second brakes open. It is noted that the fourth gear substantially corresponds in terms of its transmission ratio to the fourth gear realized using the third clutch in the first refinement of the invention described above. In embodiments which combine both of the stated refinements, this gear can thus be realized in two ways.

In all of the embodiments mentioned above, it may be provided, with regard to the structural configuration, that the output shaft is in the form of a hollow shaft which extends coaxially around the input shaft. This is necessary for transverse-installation variants of the invention.

Here, it may preferably be provided that attachment points of the input and output shafts are situated at the edge on a common axial side of the hybrid drive configuration. This special configuration is however possible only in the case of the first three embodiments described above. In the case of these, an alternative configuration, provided in particular for longitudinal-installation variants of the invention, is possible in which it is provided that the input shaft and the output shaft are disposed axially adjacent one another and attachment points of the two shafts are situated at the edges on opposite axial sides of the hybrid drive configuration.

Further features and advantages of the invention will emerge from the following specific description and from the drawings.

Although the invention is illustrated and described herein as embodied in a hybrid drive configuration for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
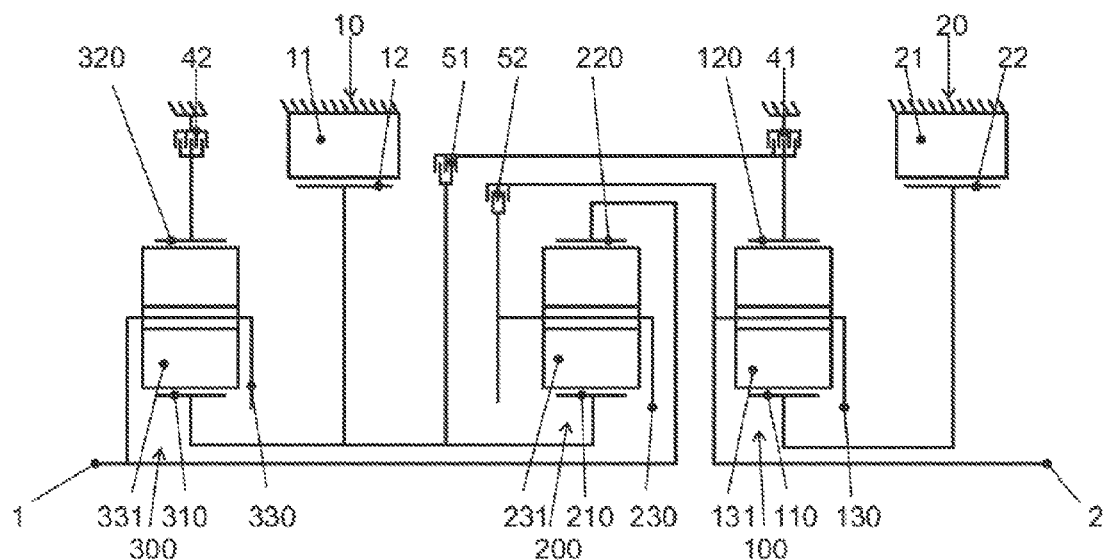
FIG. 1 is a schematic view illustrating an embodiment of the invention in a first base variant for longitudinal installation.

In the figures, the same reference signs are used to denote identical or analogous components. Referring now to the figures of the drawings in detail and first, particularly, to FIG. 1 thereof, there is shown a first base variant of the invention as an embodiment for longitudinal installation in a motor vehicle. The input shaft 1 and the output shaft 2 are disposed axially adjacent to one another. The figures do not illustrate in a detailed manner an internal combustion engine which is connectable indirectly or directly to the input shaft 1, and a drivetrain output section which is connectable indirectly or directly to the output shalt 2.

The drive configuration shown has two electric machines, specifically the first electric machine 10 and the second electric machine 20, which can both selectively be operated in motor mode or in generator mode. Each of the electric machines 10, 20 has a stator 11, 21 and a rotor 12, 22, wherein, in the embodiment shown, both electric machines 10, 20 are of internal-rotor type of construction.

Furthermore, the configuration shown has three planetary gear sets, specifically a first planetary gear set 100, a second planetary gear set 200 and a third planetary gear set 300. The planetary gear sets 100, 200, 300 each have a sun gear 110, 210, 310 and an internal gear 120, 220, 320. They furthermore each have a web, also called a carrier, 130, 230, 330 on which there is rotatably mounted in each case at least one set of planet gears 131, 231, 331 which mesh both with the associated sun gear 110, 210, 310 and with the respectively associated internal gear, also called a ring gear, 120, 220, 320.

Furthermore, the configuration shown has two brakes, specifically a first brake 41 and a second brake 42, through the use of which a respectively connected element is switchably coupled to the housing, that is to say is fixed to or rotatable freely with respect to the housing depending on the switching position of the brake 41, 42. The configuration shown furthermore has two clutches, specifically a first clutch 51 and a second clutch 52, which each couple two inherently rotatable elements to one another in switchable fashion such that these elements are fixed to one another or are rotatable independently of one another depending on the switching position of the clutch 51, 52.

This basic construction and the assignment of reference signs is the same for all of the embodiments in FIGS. 1 to 11, and will not be repeated below in conjunction with each individual figure. It is substantially realized even in the embodiment of FIG. 12, wherein special features therein with regard to a double set of planet gears 331, 332 of the third planetary gear set will be discussed further below.

In the embodiment of FIG. 1, the sun gear 110 of the first planetary gear set 100 is connected to the rotor 22 of the second electric machine. The internal gear 120 of the first planetary gear set 100 is coupled, that is to say is fixable, by way of the first brake 41 to the housing. Furthermore, the internal gear 120 of the first planetary gear set 100 is coupled by way of a first clutch 51 both to the rotor 12 of the first electric machine and to the two sun gears 210, 310 of the second and third planetary gear sets 200, 300. The web 130 of the first planetary gear set 100 is connected to the output shaft 2. This web is also coupled by way of the second clutch 52 to the web 230 of the second planetary gear set. The internal gear 220 of the second planetary gear set is connected to the input shaft 1. This internal gear is also connected to the web 330 of the third planetary gear set. The web 230 of the second planetary gear set 200 is, by way of the second clutch 52 already mentioned above, coupled to the web 130 of the first planetary gear set 100, which is connected to the output shaft 2. The sun gear 210 of the second planetary gear set 200 is connected to the rotor 12 of the first electric machine and to the sun gear 310 of the third planetary gear set 300. This sun gear is also coupled by way of the first clutch 51, already mentioned above, to the internal gear 120 of the first planetary gear set. The internal gear of the third planetary gear set is coupled, that is to say is fixable, by way of the second brake 42 to the housing. The web 330 of the third planetary gear set is connected to the input shaft 1 and to the internal gear 220 of the second planetary gear set 200. The sun gear 310 of the third planetary gear set is connected to the rotor 12 of the first electric machine and to the sun gear 210 of the second planetary gear set, and is coupled by way of the first clutch 51, already mentioned above, to the internal gear 120 of the first planetary gear set. This configuration will hereinafter be referred to as base variant 1. With regard to the various switching positions of the switching elements and the operating modes realized thereby, reference is made to the general part of the description above.

Figure 2:
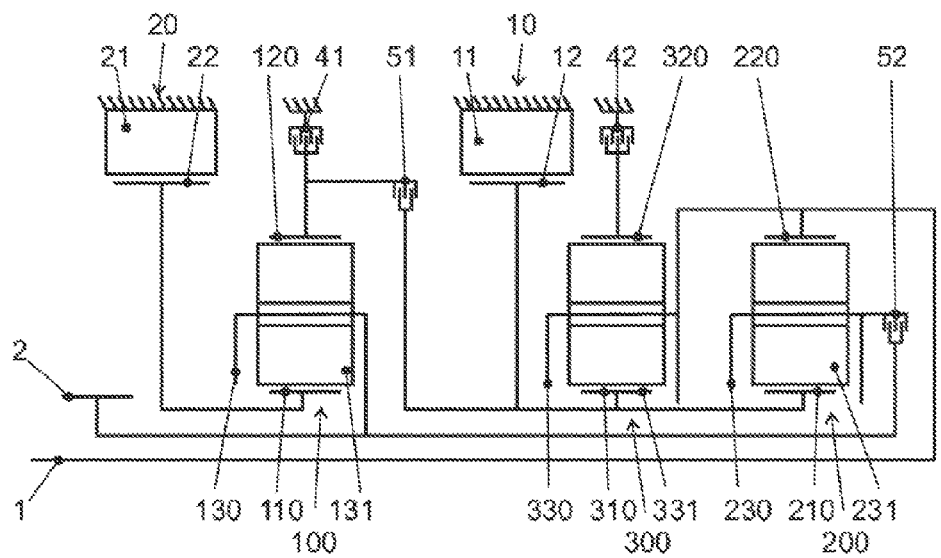
FIG. 2 is a schematic view illustrating an embodiment of the invention in the first base variant for transverse installation.

A person skilled in the art will understand that the base variant 1, which is defined by the connection configuration discussed above, can be realized in a variety of layouts, which are expedient in each case for particular applications with regard to front-wheel drive; rear-wheel drive, longitudinal installation and/or transverse installation. For example, FIG. 2 shows a layout of the base variant 1 suitable for transverse installation. This layout is considered to be particularly expedient because it can be realized with radii which decrease from left to right (as seen in FIG. 2), which can be exploited for use of a conical transmission housing, which is particularly expedient from a structural space aspect. It is evident that the output shaft 2 is in this case in the form of a hollow shaft which extends concentrically around the input shaft. Reference may otherwise be made to the explanations given above.

Figure 3:
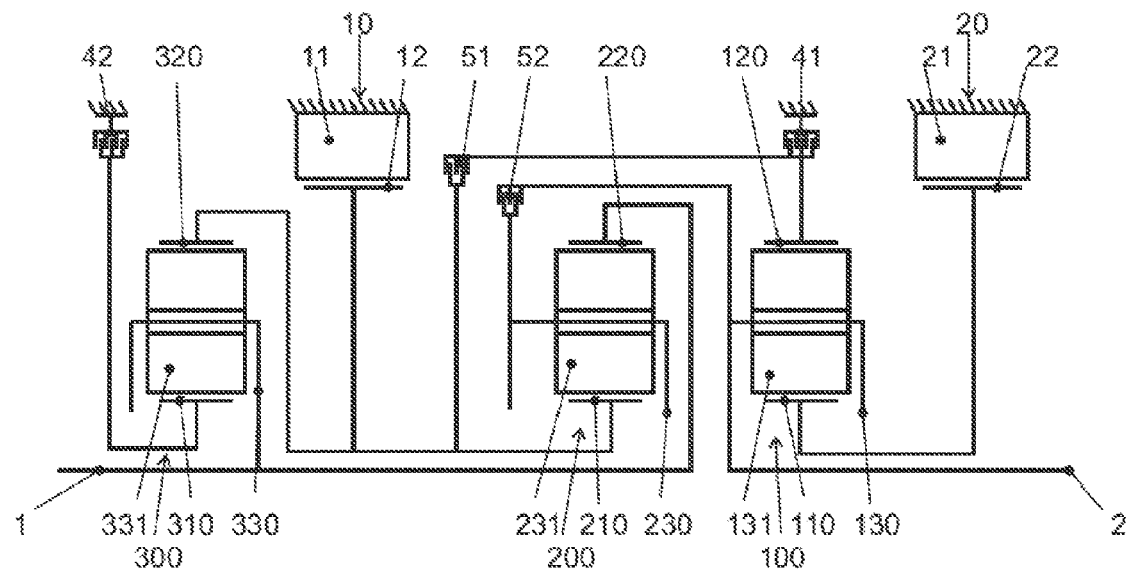
FIG. 3 is a schematic view illustrating an embodiment of the invention in a second base variant for longitudinal installation.
Figure 4:
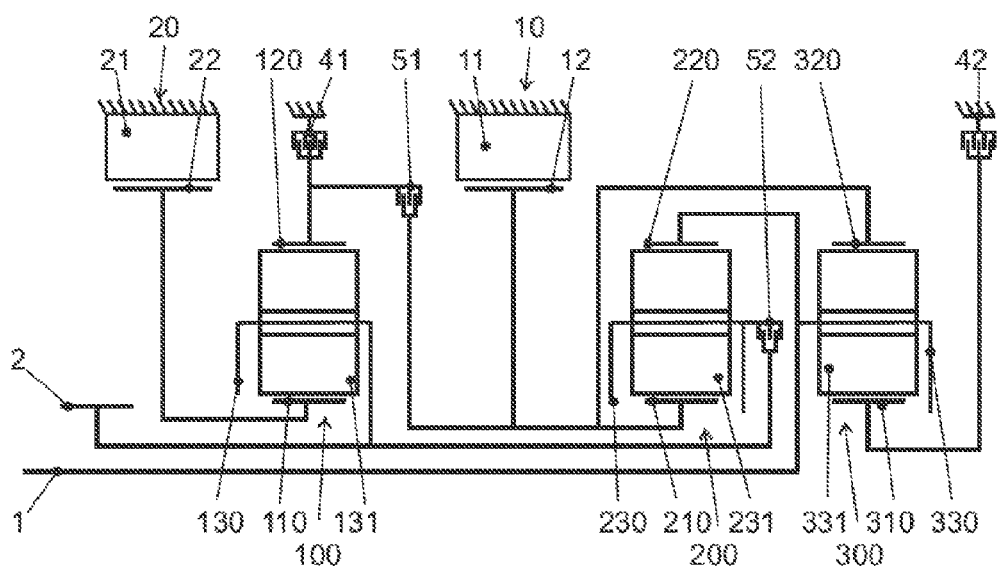
FIG. 4 is a schematic view illustrating an embodiment of the invention of the second base variant for transverse installation.

FIGS. 3 and 4 show a longitudinal-installation layout (FIG. 3) and a transverse-installation layout (FIG. 4) of a second base variant of the present invention. The difference with respect to the first base variant lies solely in the connection configuration of the third planetary gear set 300. In particular; the connections of the sun gear 310 and of the internal gear 320 are interchanged in relation to the base variant 1. Reference may otherwise be made to the explanation above.

Figure 5:
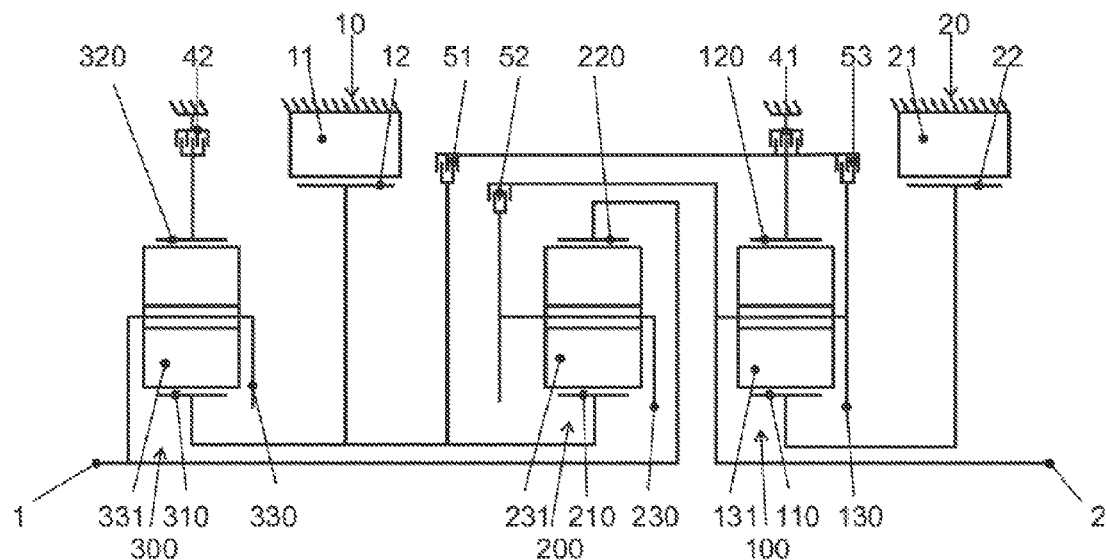
FIG. 5 is a schematic view illustrating an embodiment of the invention in a first enhancement of the configuration of FIG. 1.
Figure 6:
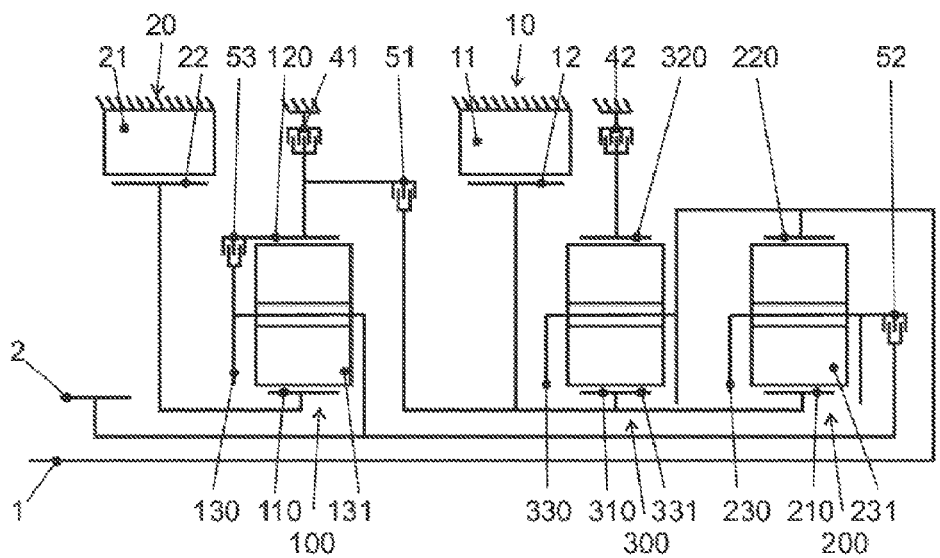
FIG. 6 is a schematic view illustrating an embodiment of the invention in a first enhancement of the configuration of FIG. 2.

FIGS. 5 and 6 each show a first enhancement of the first base variant as per FIGS. 1 and 2. The connection configurations shown therein are enhanced to include a third clutch 53 through the use of which the web 130 and the internal gear 120 of the first planetary gear set 100 are coupled. This means that the two elements can be fixed to one another such that the first planetary gear set 100 rotates as a block when the third clutch 53 is closed. With regard to the new operating modes that this enhancement gives rise to, reference is made to the general part of the description above.

Figure 7:
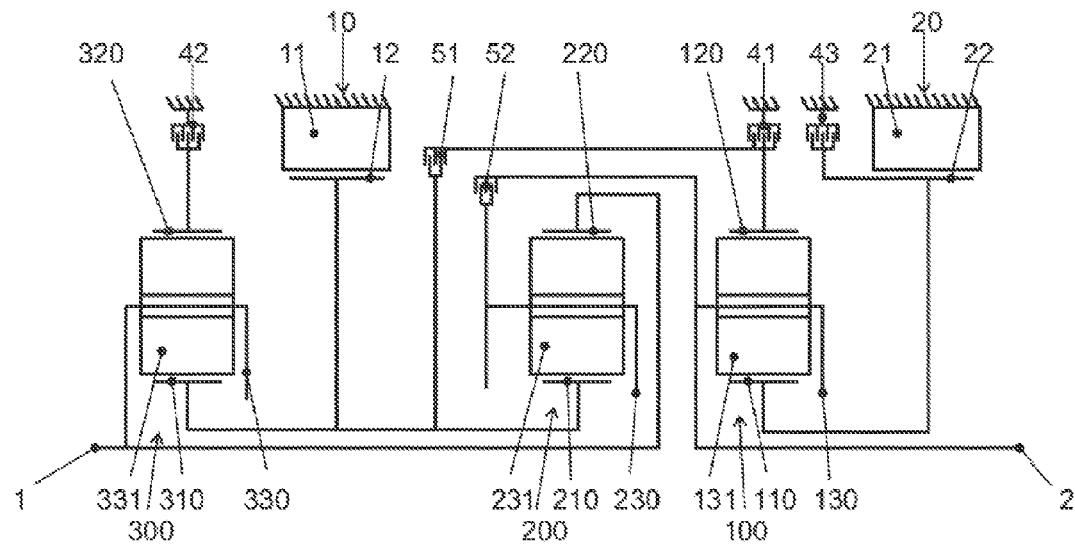
FIG. 7 is a schematic view illustrating an embodiment of the invention in a second enhancement of the configuration of FIG. 1.
Figure 8:
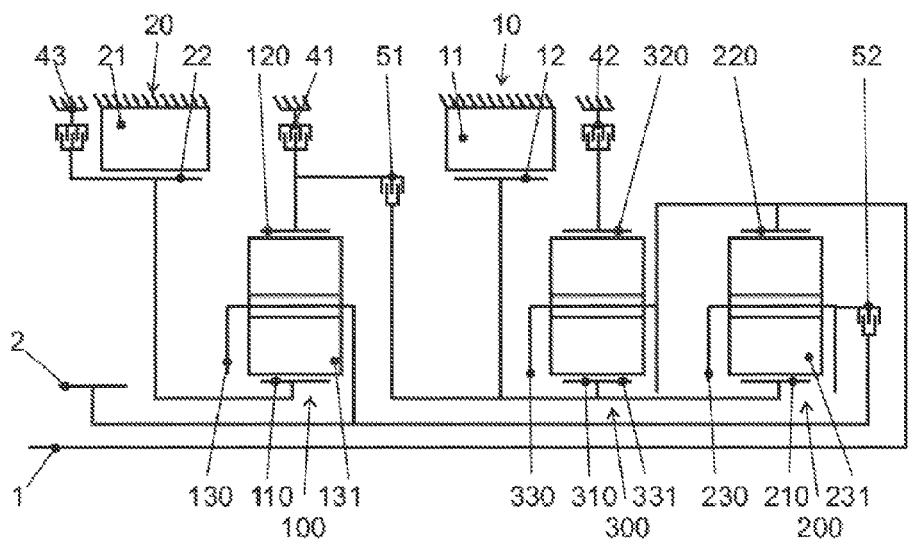
FIG. 8 is a schematic view illustrating an embodiment of the invention in a second enhancement of the configuration of FIG. 2.

FIGS. 7 and 8 show a second enhancement of the base variant as per FIGS. 1 and 2, which can be realized as an alternative to or jointly with the first enhancement discussed above. The second enhancement is characterized by an additional, third brake 43, through the use of which the rotor 23 of the second electric machine 20 can be fixed to the transmission housing. With regard to the new operating modes that this gives rise to, reference is made to the general part of the description above.

A person skilled in the art will identify that the enhancements described above may in the same way also be used in conjunction with the second base variant as per FIGS. 3 and 4. This applies to all layouts and axial element sequences that are conceivable for realizing the two base variants.

Figure 9:
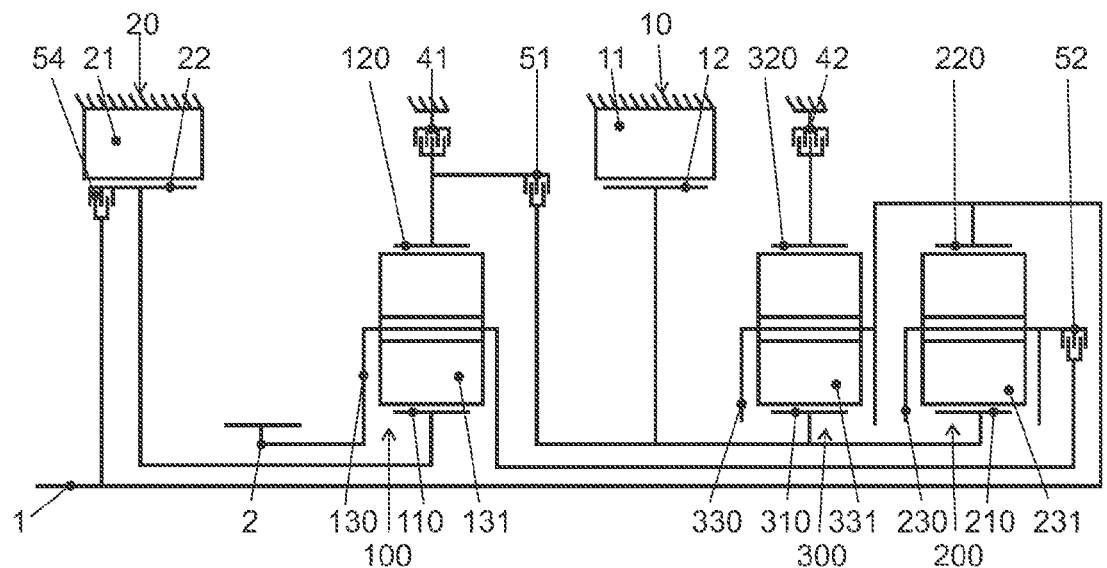
FIG. 9 is a schematic view illustrating an embodiment of the invention in a third enhancement of a modified configuration as per FIG. 2.
Figure 10:
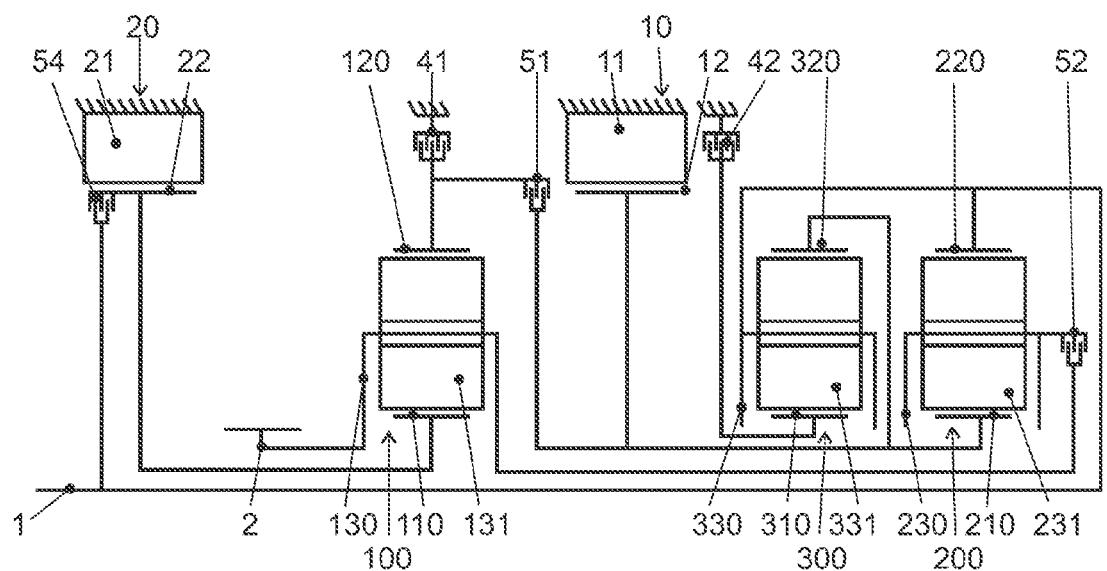
FIG. 10 is a schematic view illustrating an embodiment of the invention in a third enhancement of a modified configuration as per FIG. 4.

This is in contrast to the third enhancement shown in FIGS. 9 and 10, which, in both base variants, can be realized only in the transverse-installation layout thereof and with a second electric machine 20 disposed at the edge at the transmission input side, that is to say outside the output shaft connection. This layout is illustrated for the base variant 1 in FIG. 9 and for the base variant 2 in FIG. 10. These layouts can be enhanced to include the fourth clutch 54 through the use of which the rotor 22 of the second electric machine 20 is coupled to the input shaft. With regard to the additional operating modes that this gives rise to, reference is made to the general part of the description above.

Figure 11:
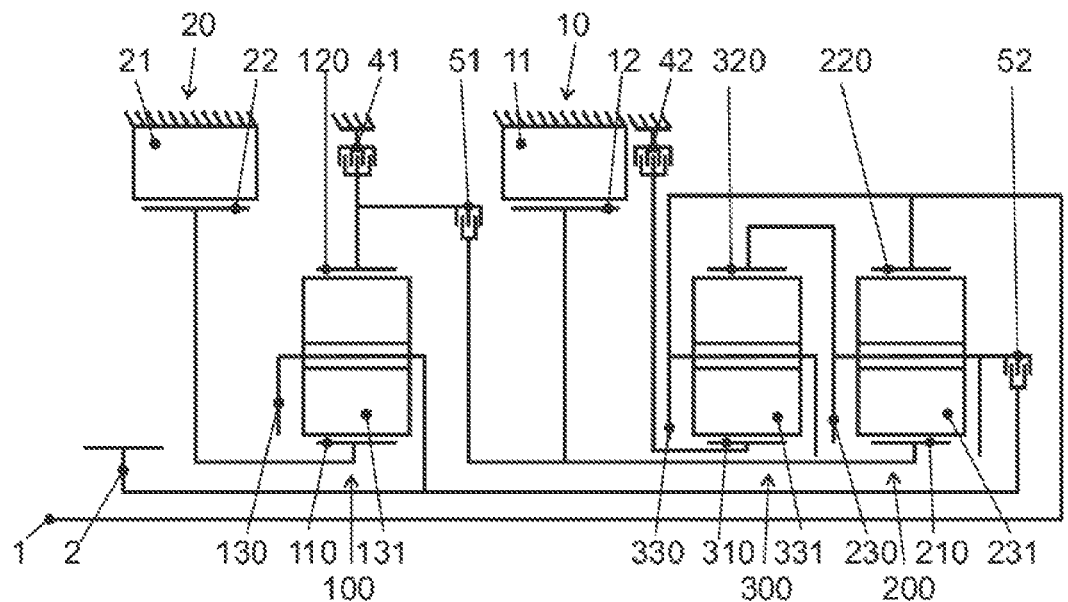
FIG. 11 is a schematic view illustrating an embodiment of the invention in a first alternative with respect to the configurations of FIGS. 2 and 4.

FIG. 11 shows a first alternative with respect to the base variants 1 and 2 in the transverse-installation layout as per FIG. 2 and FIG. 4. The difference with respect to the configuration as per FIG. 2 lies in the connection configuration of the third planetary gear set 300. In particular, the sun gear 310 thereof rather than the internal gear 320 thereof is coupled by way of the second brake 42 to the transmission housing. The internal gear 320 is instead connected to the web 230 of the second planetary gear set 200. The connection of the web 330 of the third planetary gear set to the internal gear 220 of the second planetary gear set 200 is maintained. With regard to the operating modes that can be realized by way of the different switching positions of the switching elements, there is no substantial change. In this respect, reference may be made to the general part of the description above.

Figure 12:
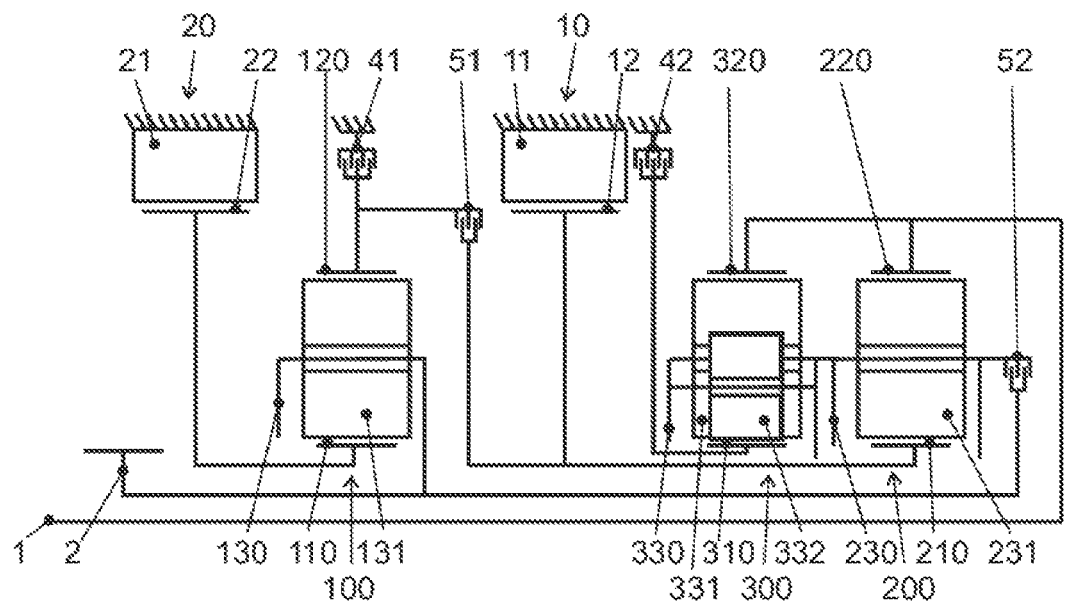
FIG. 12 is a schematic view illustrating an embodiment of the invention in a second alternative with respect to the configurations of FIGS. 2 and 4.
Figure 13:
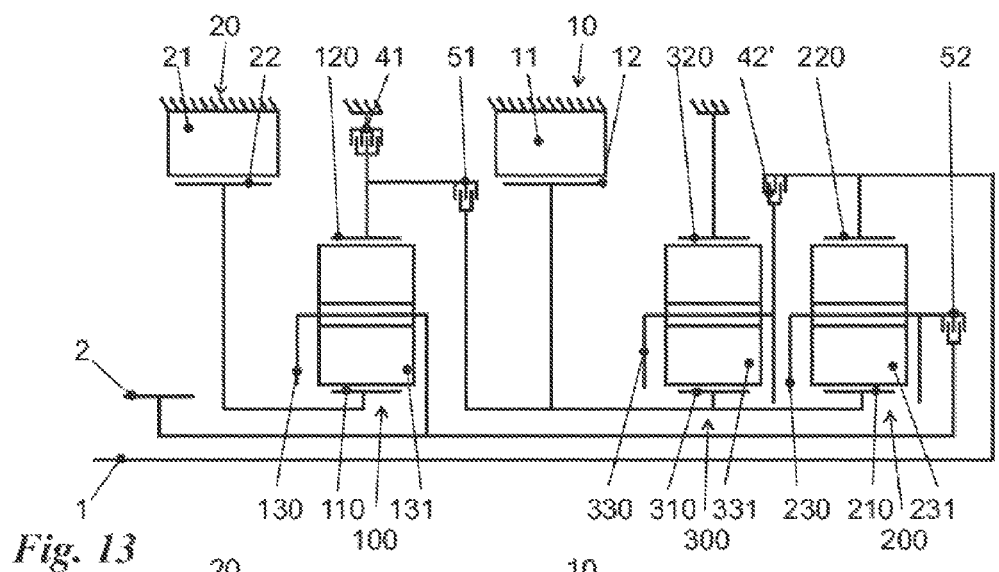
FIG. 13 is a schematic view illustrating a first equivalent with respect to the embodiment of FIG. 2.
Figure 14:
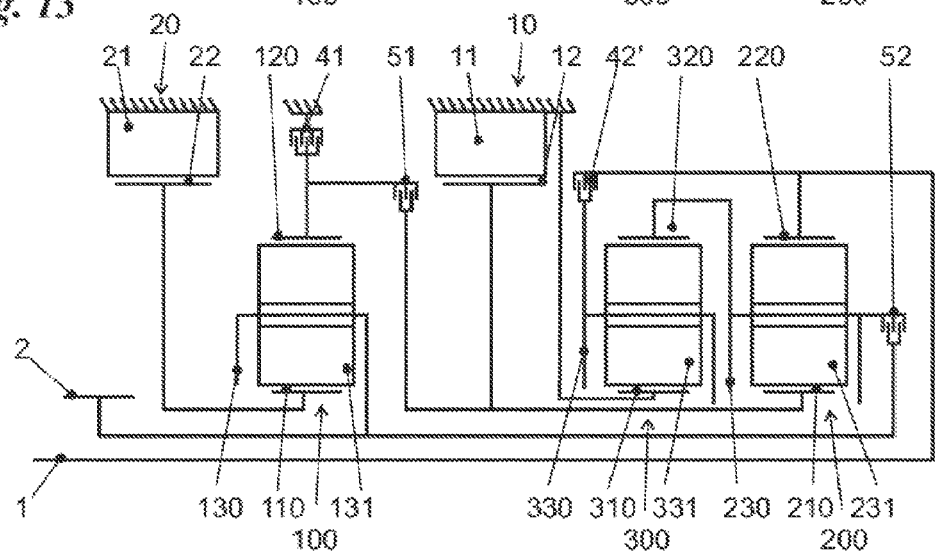
FIG. 14 is a schematic view illustrating a first equivalent with respect to the embodiment of FIG. 4.
Figure 15:
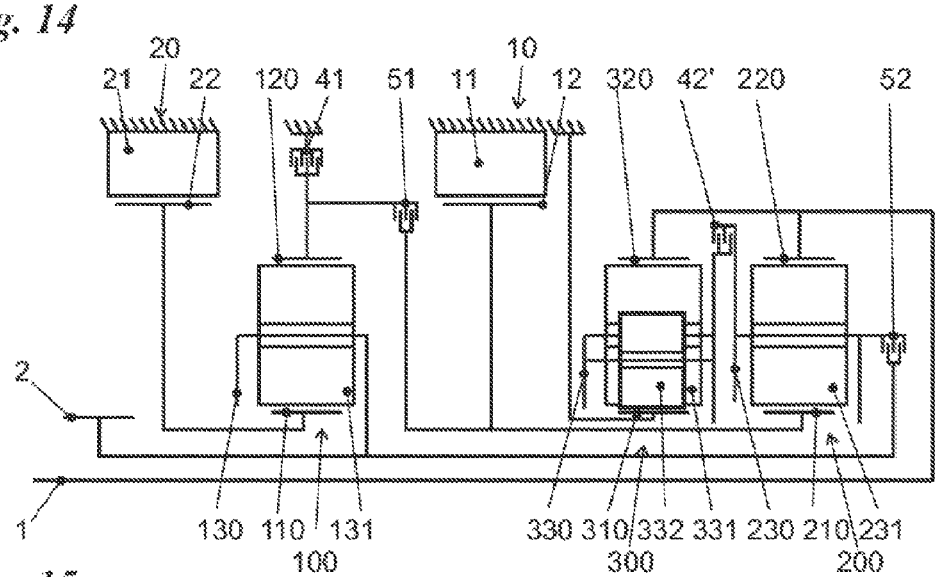
FIG. 15 is a schematic view illustrating a first equivalent with respect to the embodiment of FIG. 12.
Figure 16:
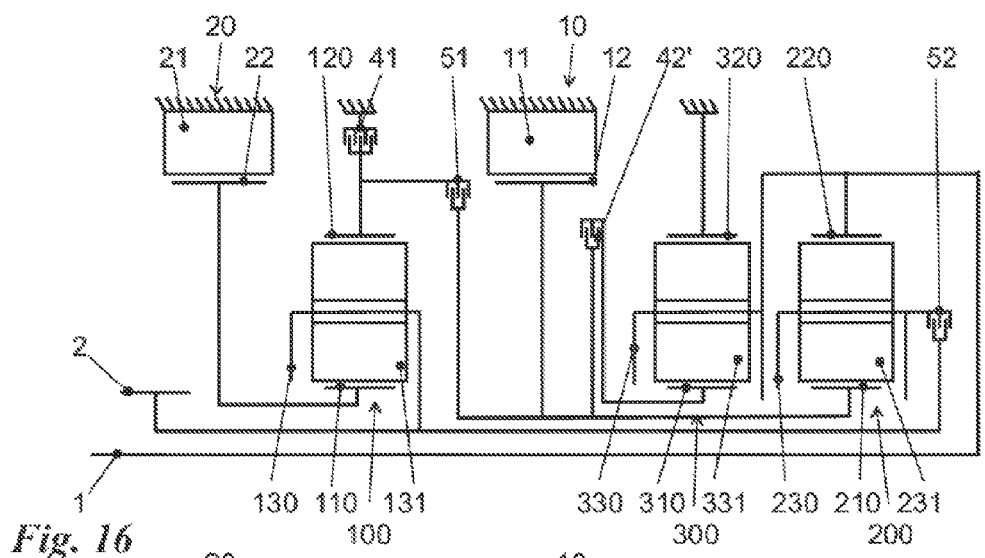
FIG. 16 is a schematic view illustrating a second equivalent with respect to the embodiment of FIG. 2.
Figure 17:
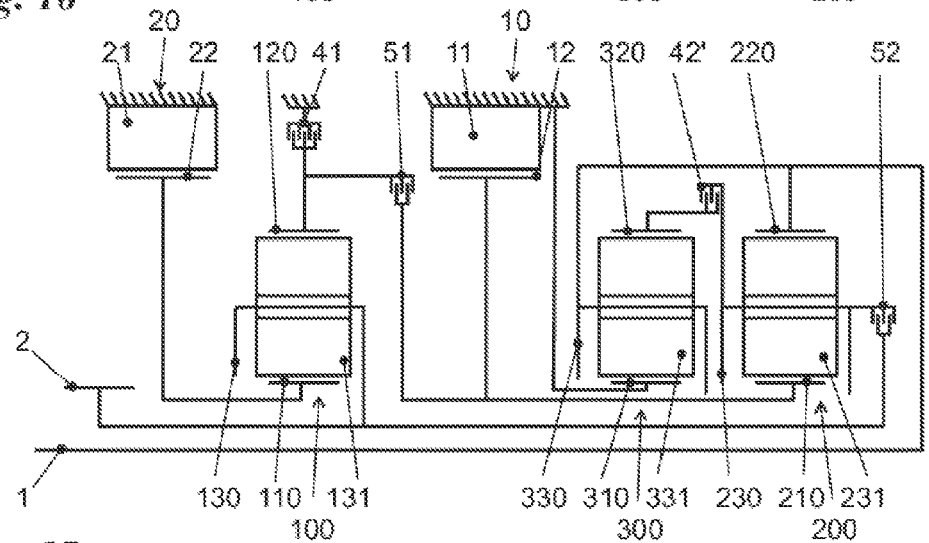
FIG. 17 is a schematic view illustrating a second equivalent with respect to the embodiment of FIG. 4.
Figure 18:
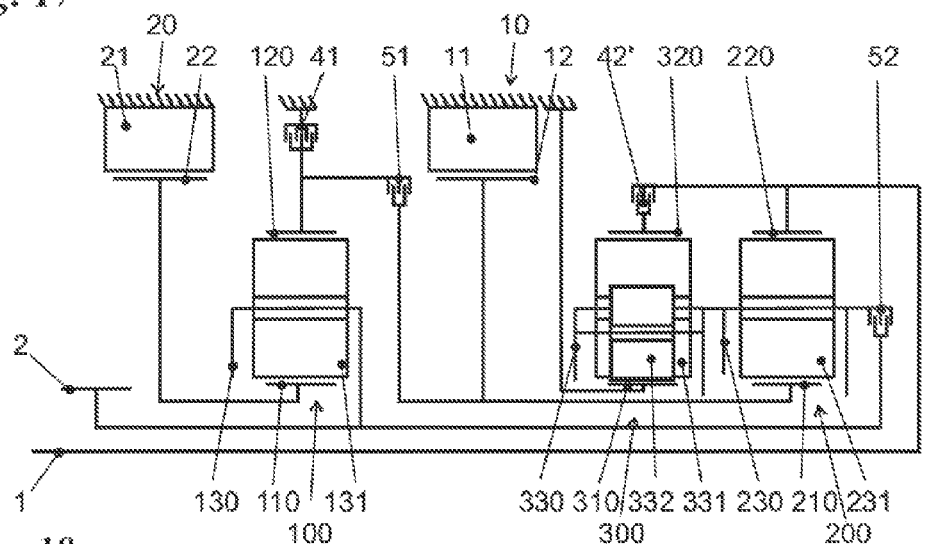
FIG. 18 is a schematic view illustrating a second equivalent with respect to the embodiment of FIG. 12.

FIG. 12 shows a second alternative with respect to the base variants 1 and 2 in the transverse-installation layout as per FIG. 2 and FIG. 4. Similarly to the above-described first alternative as per FIG. 11, it is also the case here that the sun gear 310 of the third planetary gear set 300 is coupled by way of the second brake 42 to the housing. However, the internal gears 320, 220 of the third and second planetary gear sets 300, 200 and the webs 330, 230 thereof are in each case short-circuited, that is to say fixedly connected to one another. In order that the two planetary gear sets 200, 300 do not act as a single planetary gear set, the third planetary gear set 300 is in this case equipped with a double planetary gear set, wherein the additional planetary gear set 332 meshes both with the first planetary gear set 331 and with the sun gear 310. In this case, too, with regard to the operating modes that can be realized, reference may be made to the general part of the description above.

A person skilled in the art will identify that the enhancements described above may self-evidently also be applied to the alternatives shown here and to other layouts that are conceivable within the scope of these alternatives.

FIGS. 13 to 18 illustrate kinematic equivalents with respect to the present invention. In all of these embodiments, the second brake 42 has been replaced by the fixing of a main shaft of the third planetary gear set 300 and the additional introduction of a clutch 42' in the connection configuration of another main shaft of the third planetary gear set 300. The fixing and the additional clutch 42' yield an effect equivalent to the effect of the second brake 42, such that with regard to the resulting operating modes, reference may be made mutatis mutandis to the above explanation, in particular to the general part of the description.

It is self-evident that the embodiments discussed in the specific description and shown in the figures represent merely illustrative exemplary embodiments of the present invention. A broad spectrum of possible variants will emerge to a person skilled in the art in the light of this disclosure.

LIST OF REFERENCE CHARACTERS

1 Input shaft
2 Output shaft
10 First electric machine
11 Stator of 10
12 Rotor of 10
20 Second electric machine
21 Stator of 20
22 Rotor of 20
41 First brake
42 Second brake
42' Equivalent clutch with respect to 42
43 Third brake
51 First clutch
52 Second clutch
53 Third clutch
54 Fourth clutch
100 First planetary gear set
110 Sun gear of 100
120 Internal gear of 100
130 Web of 100
131 Planet gears on 130
200 Second planetary gear set
210 Sun gear of 200
220 Internal gear of 200
230 Web of 200
231 Planet gears on 230
300 Third planetary gear set
310 Sun gear of 300
320 Internal gear of 300
330 Web of 300
331 Planet gears on 330
332 Second planetary gear set on 330

What is claimed is:

1. A hybrid drive configuration for a motor vehicle, comprising:
    a transmission housing;
    a first and a second electric machine each having a rotor and each having a stator fixedly connected to said transmission housing, said first and said second electric machine each being operable both in a motor mode and in a generator mode and, by way of power electronics, being connectable to one another and to an electrical energy store;
    an input shaft, which is connectable to an internal combustion engine, and an output shaft, which is connectable to a drivetrain output section;
    a first brake and a second brake;
    a first clutch and a second clutch;
    a first planetary gear set having a sun gear, a web, and an internal gear, said sun gear of said first planetary gear set being connected to said rotor of said second electric machine, said web of said first planetary gear set being connected to said output shaft, and said internal gear of said first planetary gear set being coupled by way of said first brake to said transmission housing;
    a second planetary gear set having a sun gear, a web, and an internal gear, said sun gear of said second planetary gear set being both coupled by way of said first clutch to said internal gear of said first planetary gear set and connected to said rotor of said first electric machine, said web of said second planetary gear set being coupled by way of said second clutch to said web of said first planetary gear set, and said internal gear of said second planetary gear set being connected to said input shaft; and
    a third planetary gear set having a sun gear, a web, and an internal gear, said web of said third planetary gear set being connected to said input shaft, wherein
        either said sun gear of said third planetary gear set or said internal gear of said third planetary gear set is connected to said rotor of said first electric machine, and
        correspondingly either said internal gear of said third planetary gear or said sun gear of said third planetary gear set is coupled by way of said second brake to said transmission housing,
    or
    said sun gear of said third planetary gear set is coupled by way of said second brake to said transmission housing, wherein
        either said web of said third planetary gear set or said internal gear of said third planetary gear set is connected to said input shaft, and
        correspondingly either said internal gear of said third planetary gear set or said web of said third planetary gear set is connected to said web of said second planetary gear set.

2. The hybrid drive configuration according to claim 1, including a third clutch, wherein said web of said first planetary gear set is coupled by way of said third clutch to said internal gear of said first planetary gear set.

3. The hybrid drive configuration according to claim 1, including a third brake, wherein said rotor of said second electric machine is coupled by way of said third brake to said transmission housing.

4. The hybrid drive configuration according to claim 1, including a further clutch, wherein said input shaft is coupled by way of said further clutch to said rotor of said second electric machine.

5. The hybrid drive configuration according to claim 2, including a fourth clutch, wherein said input shaft is coupled by way of said fourth clutch to said rotor of said second electric machine.

6. The hybrid drive configuration according to claim 1, wherein said input shaft and said output shaft are disposed axially adjacent one another, and respective attachment points of said input shaft and of said output shaft are situated at edges on opposite axial sides of the hybrid drive configuration.

7. The hybrid drive configuration according to claim 1, wherein said output shaft is embodied as a hollow shaft extending coaxially around said input shaft.

8. The hybrid drive configuration according to claim 6, wherein respective attachment points of said input shaft and of said output shaft are situated at an edge on a common axial side of the hybrid drive configuration.

* * * * *